United States Patent
Kushihara et al.

(10) Patent No.: US 12,110,356 B2
(45) Date of Patent: Oct. 8, 2024

(54) HEAT-CURABLE RESIN COMPOSITION

(71) Applicant: Shin-Etsu Chemical Co., Ltd., Tokyo (JP)

(72) Inventors: Naoyuki Kushihara, Annaka (JP); Rina Sasahara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/869,197

(22) Filed: Jul. 20, 2022

(65) Prior Publication Data

US 2023/0067259 A1 Mar. 2, 2023

(30) Foreign Application Priority Data

Aug. 2, 2021 (JP) ................ 2021-126422

(51) Int. Cl.
| | | |
|---|---|---|
| *C08F 283/10* | (2006.01) | |
| *C09D 151/08* | (2006.01) | |
| *C09J 151/08* | (2006.01) | |

(52) U.S. Cl.
CPC .......... *C08F 283/10* (2013.01); *C09D 151/08* (2013.01); *C09J 151/08* (2013.01)

(58) Field of Classification Search
CPC .... C08F 283/10; C08F 222/40; C09D 151/08; C09J 151/08
See application file for complete search history.

(56) References Cited

U.S. PATENT DOCUMENTS

| | | |
|---|---|---|
| 2018/0242448 A1 | 8/2018 | Yoshikawa et al. |
| 2021/0278767 A1 | 9/2021 | Ueno et al. |
| 2022/0019146 A1* | 1/2022 | Yamane ............... C08G 73/127 |

FOREIGN PATENT DOCUMENTS

| | | | |
|---|---|---|---|
| JP | 1-210408 A | 8/1989 | |
| JP | 2011-32463 A | 2/2011 | |
| JP | 2018-28044 A | 2/2018 | |
| JP | 2018-135506 A | 8/2018 | |
| JP | 2018-177931 A | 11/2018 | |
| JP | 2019-1965 A | 1/2019 | |
| JP | 2019-99710 A | 6/2019 | |
| JP | 2022-1615 A | 1/2022 | |
| WO | WO-2018016614 A1 * | 1/2018 | .......... C07C 43/215 |
| WO | WO 2020/004316 A1 | 1/2020 | |

OTHER PUBLICATIONS

Japanese Office Action for Japanese Application No. 2021-126422, dated Mar. 19, 2024, with English translation.

* cited by examiner

*Primary Examiner* — Robert S Jones, Jr.
*Assistant Examiner* — Jiangtian Xu
(74) *Attorney, Agent, or Firm* — Birch, Stewart, Kolasch & Birch, LLP

(57) ABSTRACT

Provided is a heat-curable resin composition capable of being turned into a cured product having a low relative permittivity, a low dielectric tangent, an excellent adhesiveness and a high resistance. The heat-curable resin composition contains:
(A) a citraconimide compound;
(B) an epoxy resin;
(C) an epoxy resin curing agent; and
(D) a curing accelerator.

15 Claims, No Drawings

HEAT-CURABLE RESIN COMPOSITION

BACKGROUND OF THE INVENTION

Field of the Invention

The present invention relates to a heat-curable resin composition using a citraconimide compound.

Background Art

In recent years, as for electronic devices such as mobile communication devices as typified by mobile phones, base station devices thereof, network infrastructure equipments such as servers and routers, and large-scale computers, the speed of the signals used in these devices and equipments is getting higher, and the capacities thereof are getting larger year after year. In this regard, printed-wiring boards installed in these electronic devices are required to be compatible with higher frequencies such as those in the 20 GHz region; demanded is a substrate material with a low relative permittivity and a low dielectric tangent, whereby transmission loss can be reduced. Other than the above electronic devices, even in the field of ITS (automobile-, transportation system-related) and in the field of indoor short-range communication, novel systems dealing with high-frequency wireless signals have gradually been put into practical use, or plans to put them into practical use are underway; a low-transmission-loss substrate material is likewise required for a printed-wiring board that is to be installed in these devices. As a material with a low relative permittivity and a low dielectric tangent, there are known heat-curable resins such as a modified polyphenyleneether resin, a maleimide resin and an epoxy resin; and thermoplastic resins such as a fluorine resin, a styrene resin and a liquid crystal polymer (JP-A-2019-1965, JP-A-2019-99710, JP-A-2018-28044, JP-A-2018-177931, JP-A-2018-135506 and JP-A-2011-32463) However, since these materials each have a high melt viscosity, and the cured products thereof are hard and brittle, while they may be suitable for use in a printed-wiring board or the like, it has been difficult to use them in adhesive agents, semiconductor encapsulation materials and the like. Further, there has been a problem that an adhesion failure will occur under a high-temperature environment due to a decreased adhesive force to a base material.

SUMMARY OF THE INVENTION

Thus, it is an object of the present invention to provide a heat-curable resin composition that is superior in handling property due to a low viscosity, and is capable of being turned into a cured product having a low relative permittivity, a low dielectric tangent, an excellent adhesiveness and a high heat resistance.

The inventors of the present invention diligently conducted a series of studies to solve the above problem, and completed the invention as follows. That is, the inventors found that the aforementioned object can be achieved with the following heat-curable resin composition.

Specifically, the present invention is to provide the following heat-curable resin composition.

[1]
A heat-curable resin composition comprising:
(A) a citraconimide compound;
(B) an epoxy resin;
(C) an epoxy resin curing agent; and
(D) a curing accelerator.

[2]
The heat-curable resin composition according to [1], wherein the citraconimide compound (A) is a biscitraconimide compound represented by the following formula (1):

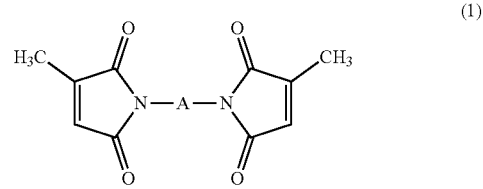

wherein A represents a divalent organic group.

[3]
The heat-curable resin composition according to [2], wherein A in the formula (1) is selected from the groups of the following structures and dimer acid skeleton-derived hydrocarbon groups:

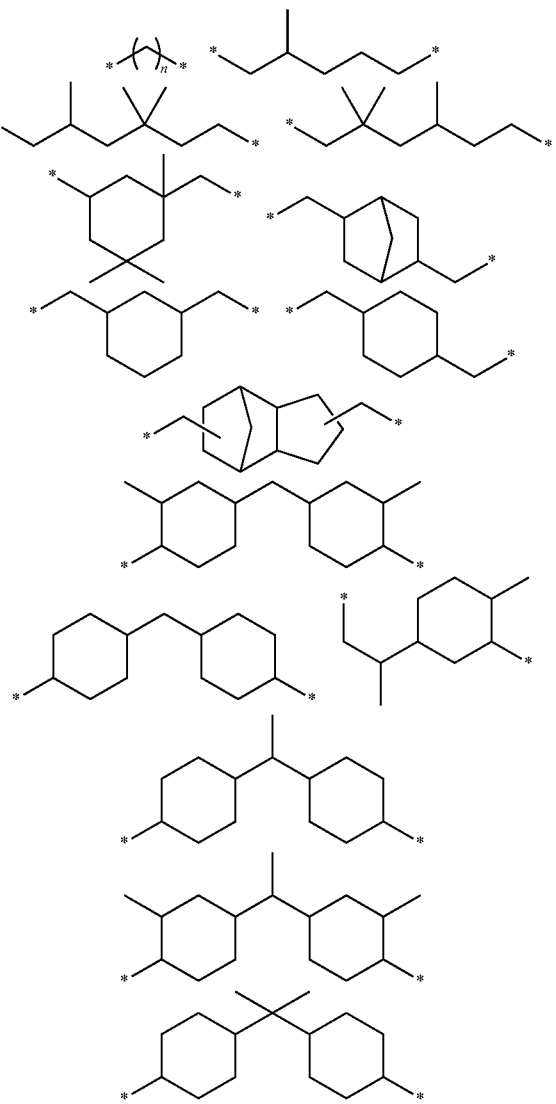

-continued

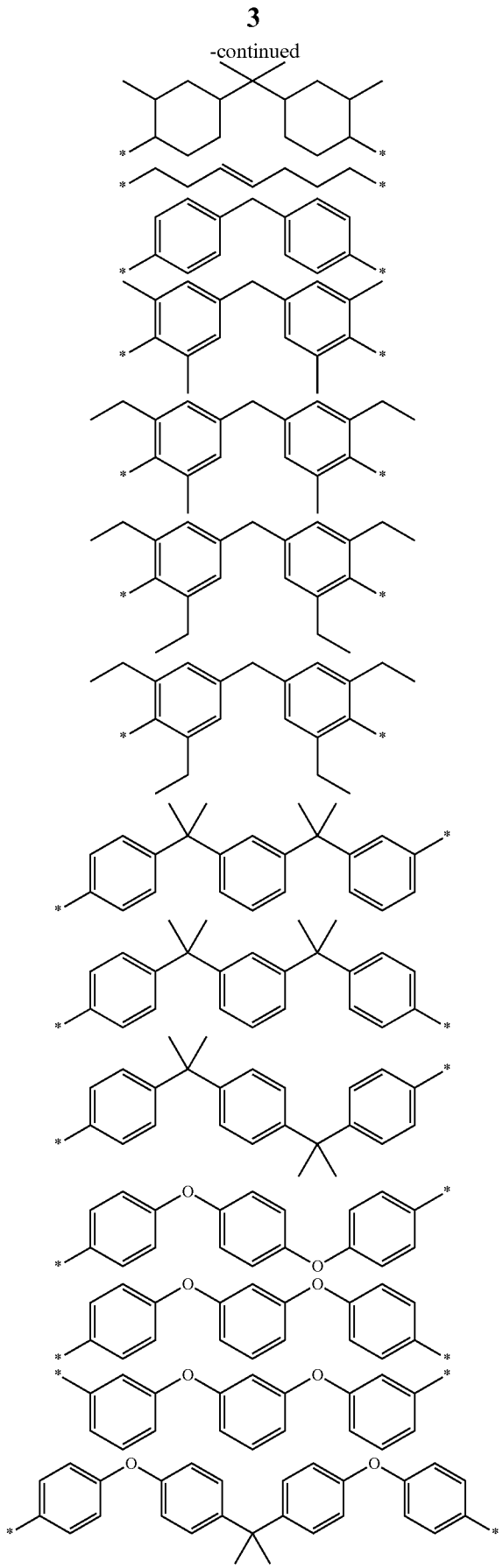

-continued

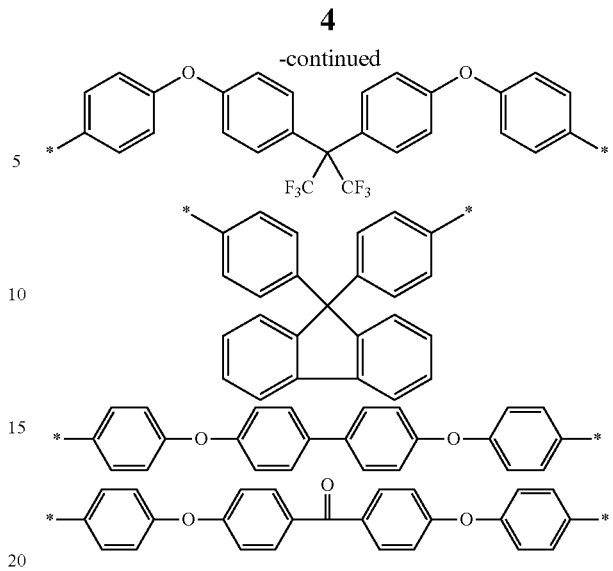

wherein * represents a bond to a nitrogen atom in the citraconimide group; n is 1 to 20.

[4]
The heat-curable resin composition according to any one of [1] to [3], wherein the epoxy resin curing agent (C) is at least one selected from an amine compound, a phenolic compound, an acid anhydride compound and an active ester compound.

[5]
The heat-curable resin composition according to any one of [1] to [4], wherein the curing accelerator (D) contains at least one of an imidazole-based curing accelerator, an organic phosphorus-based curing accelerator and a tertiary amine-based curing accelerator.

[6]
The heat-curable resin composition according to any one of [1] to [5], wherein the epoxy resin (B) has at least two epoxy groups per each molecule.

[7]
The heat-curable resin composition according to any one of [1] to [6], wherein
the component (B) is contained in an amount of 1 to 900 parts by mass per 100 parts by mass of the component (A),
a molar equivalent ratio of functional groups in the curing agent as the component (C) that are reactive with epoxy groups to 1 molar equivalent of epoxy groups in the epoxy resin (B) is 0.1 to 4.0, and
the component (D) is contained in an amount of 0.01 to 20 parts by mass per 100 parts by mass of the component (A).

[8]
The heat-curable resin composition according to any one of [1] to [7], wherein the citraconimide compound (A) has a number average molecular weight of 200 to 10,000.

[9]
An adhesive agent comprising the heat-curable resin composition according to any one of [1] to [8].
A semiconductor encapsulation material comprising the heat-curable resin composition according to any one of [1] to [8].
The cured product of the heat-curable resin composition of the present invention has a high adhesiveness and a high heat resistance while exhibiting a low relative permittivity and a low dielectric tangent. Thus, the composition of the present invention is suitable for use in an adhesive agent, a semiconductor encapsulation material and the like.

DETAILED DESCRIPTION OF THE INVENTION

The present invention is described in detail hereunder.
(A) Citraconimide Compound
A component (A) used in the present invention is a citraconimide compound. A citraconimide group is a group obtained by substituting one hydrogen atom in a maleimide group with a methyl group. Due to the effect of this methyl group, and as compared to a maleimide compound having the same skeleton, not only a cured product of a composition containing such citraconimide compound exhibits a lower permittivity and a lower dielectric tangent, but the compound itself also has a lower melting point such that a compatibility thereof to other components will be improved as well.

There are no particular restrictions on the property under room temperature and a number average molecular weight of the citraconimide compound as the component (A); this number average molecular weight is preferably 200 to 10,000, more preferably 200 to 5,000, even more preferably 200 to 2,000.

In this specification, the number average molecular weight is a number average molecular weight in terms of polystyrene that is measured by gel permeation chromatography (GPC) under the following measurement conditions.
[GPC Measurement Conditions]
Developing solvent: Tetrahydrofuran (THF)
Flow rate: 0.35 mL/min
Detector: Refractive index detector (RI)
Column: TSK Guardcolumn Super H-L
TSK gel Super HZ4000 (4.6 mmI.D.×15 cm×1)
TSK gel Super HZ3000 (4.6 mmI.D.×15 cm×1)
TSK gel Super HZ2000 (4.6 mmI.D.×15 cm×2)
(All manufactured by TOSOH CORPORATION)
Column temperature: 40° C.
Sample injection volume: 5 μL (THF solution having a concentration of 0.2% by mass)

In terms of availability of an amine compound as a raw material, solubility of the citraconimide compound in a solvent, and ease of synthesis of the citraconimide compound, it is preferred that the citraconimide compound as the component (A) be a biscitraconimide compound having two citraconimide groups per each molecule, particularly preferably a biscitraconimide compound represented by the following formula (1):

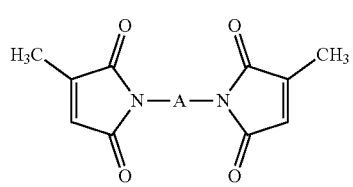

(1)

wherein A has a divalent organic group.

Further, in order to achieve a low elasticity and excellent dielectric properties (low relative permittivity and low dielectric tangent) after curing, it is more preferred that the divalent organic group represented by A in the citraconimide compound be that selected from the groups of the following structures and dimer acid skeleton-derived hydrocarbon groups:

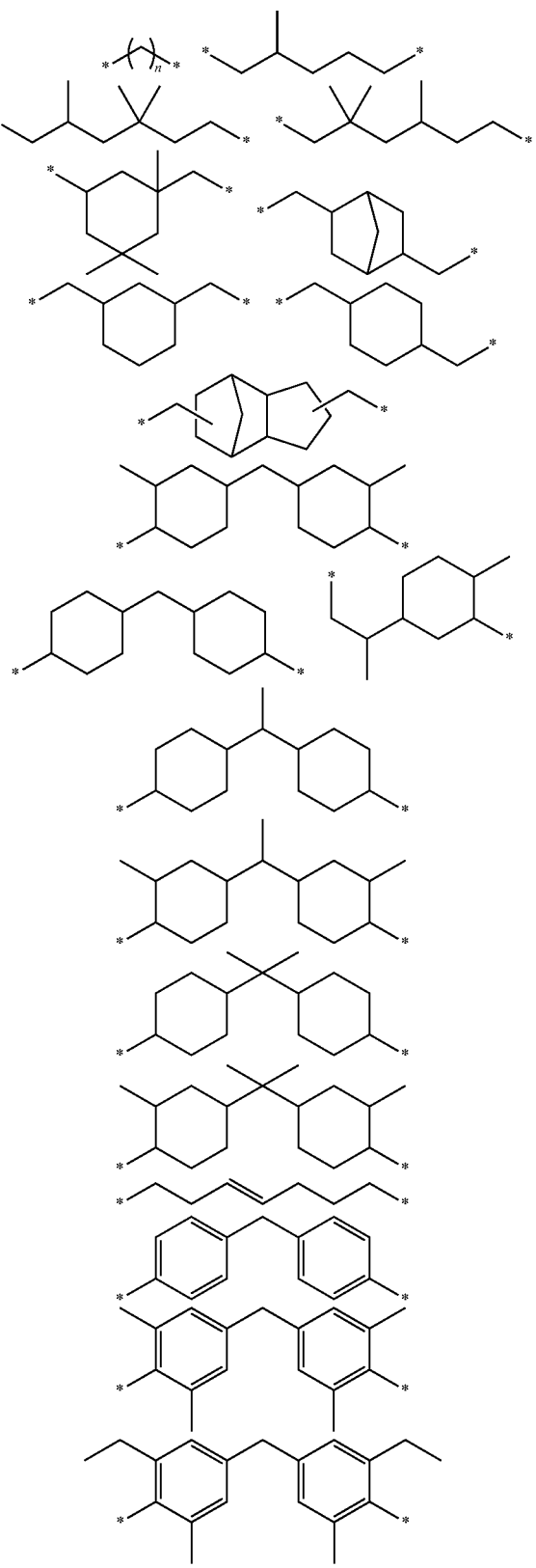

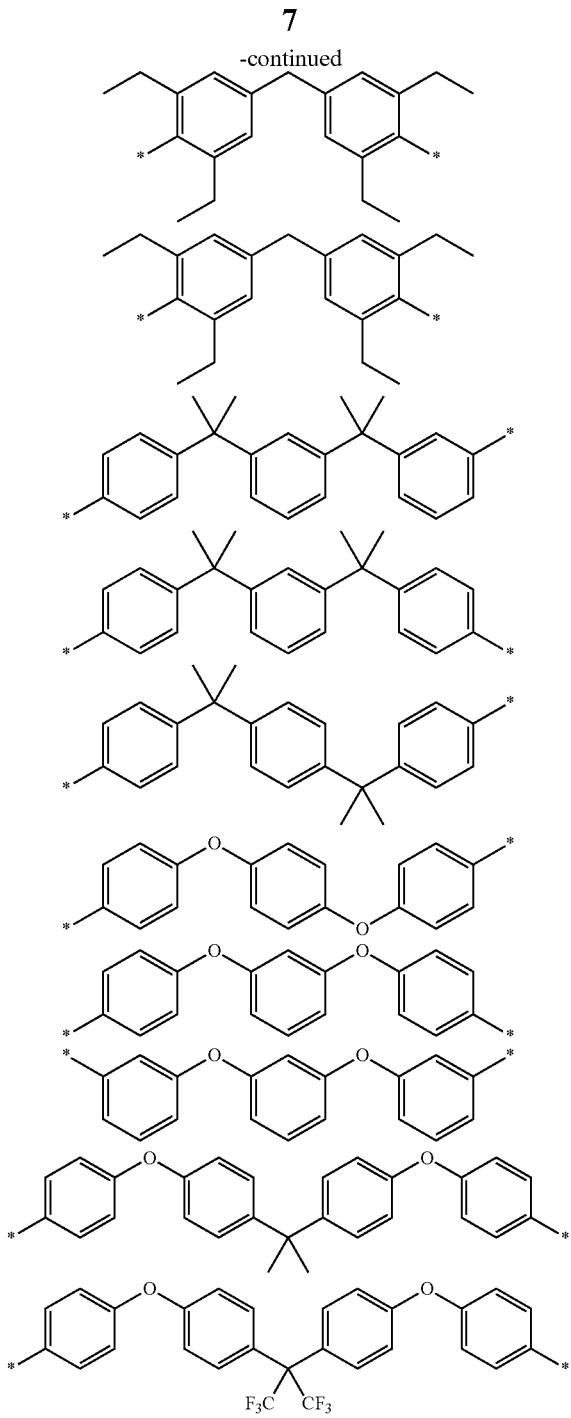

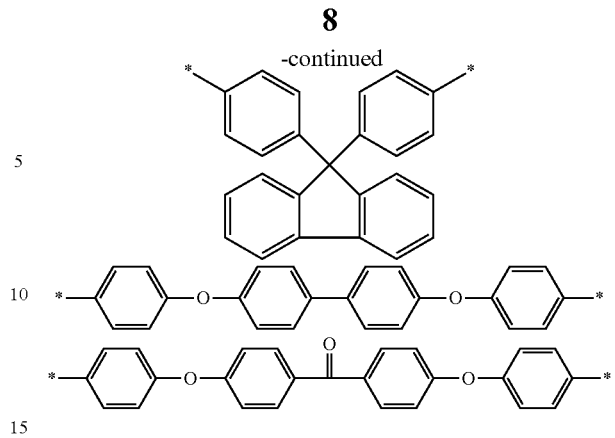

wherein * represents a bond to a nitrogen atom in the citraconimide group; n is 1 to 20.

In terms of dielectric properties and flexibility of the cured product, it is particularly preferred that the divalent organic group represented by A be a group having three or more aromatic rings, such as a group induced from a diamine such as 1,3-bis[2-(4-aminophenyl) propyl]benzene, 1,4-bis[2-(4-aminophenyl)-2-propyl)benzene, 2,2-bis[4-(4-aminophenoxy)phenyl]propane and 2,2-bis[4-(4-aminophenoxy)phenyl]hexafluoropropane (i.e. a group obtained by removing two amino groups from any of these diamines).

A dimer acid is a liquid dibasic acid whose main component is a dicarboxylic acid having 36 carbon atoms, and is produced by dimerizing an unsaturated fatty acid having 18 carbon atoms and whose raw material is a natural substance such as a vegetable fat or oil. A dimer acid skeleton is not limited to a single type of skeleton, but may have multiple types of structures, where there may exit several types of isomers thereof. Typical dimer acids are grouped into the categories of (a) linear type, (b) monocyclic type, (c) aromatic ring type, and (d) polycyclic type.

In this specification, a dimer acid skeleton refers to a group derived from a dimer diamine having a structure established by substituting the carboxy group(s) in such dimer acid with a primary aminomethyl group.

That is, as the dimer acid skeleton-derived hydrocarbon group possessed by the citraconimide compound as the component (A), it is preferred that the hydrocarbon group be a branched divalent hydrocarbon group obtained by substituting the two carboxy groups in any of the dimer acids represented by the following (a) to (d) with methylene groups.

Further, when the citraconimide compound as the component (A) has a dimer acid skeleton-derived hydrocarbon group(s), it is more preferred that such dimer acid skeleton-derived hydrocarbon group have a structure with fewer carbon-carbon double bonds therein as a result of a hydrogenation reaction, in terms of heat resistance and reliability of the cured product.

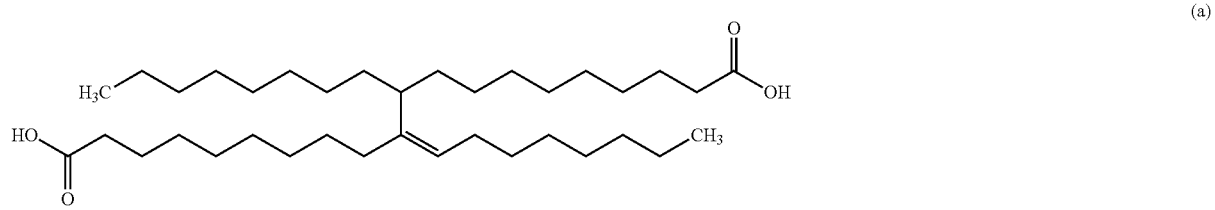

(a)

-continued

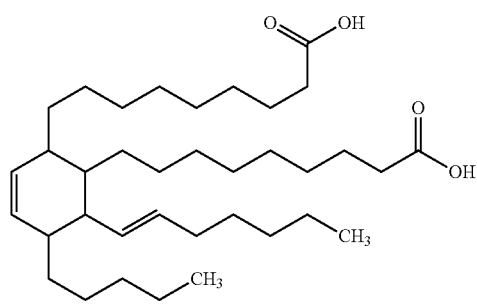

(b)

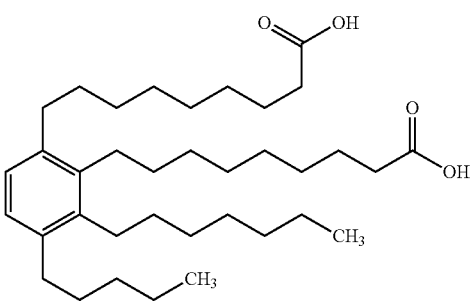

(c)

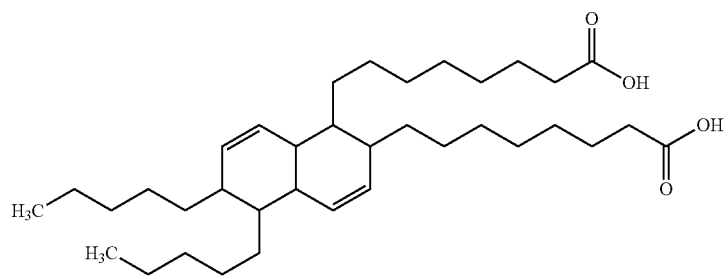

(d)

One kind of the citraconimide compound as the component (A) may be used alone, or two or more kinds thereof may be used in combination.

In the heat-curable resin composition of the present invention, it is preferred that the component (A) be contained by an amount of 20 to 95% by mass, more preferably 30 to 92% by mass, even more preferably 40 to 90% by mass, per a sum total of the components (A), (B), (C) and (D).

(B) Epoxy Resin

An epoxy resin (B) is added to promote a reaction of the citraconimide compound as the component (A).

It is preferred that this epoxy resin has at least two epoxy groups per each molecule, and there may be used a conventionally known epoxy resin.

For example, there may be listed a bisphenol-type epoxy resin such as a bisphenol A-type epoxy resin, a bisphenol F-type epoxy resin and a bisphenol S-type epoxy resin; a novolac-type epoxy resin such as a phenol novolac-type epoxy resin, a cresol novolac-type epoxy resin, a bisphenol A novolac-type epoxy resin and a bisphenol F novolac-type epoxy resin; an alicyclic epoxy resin such as a dicyclopentadiene-type epoxy resin and 3,4-epoxycyclohexenylmethyl-3',4'-epoxycyclohexene carboxylate; a polyfunctional phenol-type epoxy resin such as a resorcinol-type epoxy resin and a resorcinol novolac-type epoxy resin; a stilbene-type epoxy resin; a triazine skeleton-containing epoxy resin; a fluorene skeleton-containing epoxy resin; a triphenolalkane-type epoxy resin; a biphenyl-type epoxy resin; a xylylene-type epoxy resin; a biphenyl aralkyl-type epoxy resin; a naphthalene-type epoxy resin; diglycidylether compounds of polycyclic aromatics such as anthracene; and a phosphorus-containing epoxy resin obtained by introducing a phosphorus compound into any of these resins and compounds. Particularly, a bisphenol A-type epoxy resin, a dicyclopentadiene-type epoxy resin, a biphenyl aralkyl-type epoxy resin and a naphthalene-type epoxy resin are preferably used.

Any one kind of the abovelisted resins and compounds may be used alone, or two or more kinds of them may be used in combination.

It is preferred that the epoxy resin (B) be added in an amount of 1 to 900 parts by mass, more preferably 2 to 450 parts by mass, even more preferably 3 to 200 parts by mass, per 100 parts by mass of the component (A). When the amount of the epoxy resin (B) added is within these ranges, there can be obtained a cured product having low dielectric properties (low permittivity and low dielectric tangent).

(C) Epoxy Resin Curing Agent

An epoxy resin curing agent (C) is added to react with the epoxy groups contained in the epoxy resin (B). The epoxy resin curing agent may simply be that containing a functional group(s) reactive with epoxy groups; particularly, preferred is at least one selected from an amine compound, a phenolic compound, an acid anhydride compound and an active ester compound.

As an amine compound, a generally known amine compound may be used. An aromatic amine compound is preferred in terms of handling property and moisture resistance reliability. Preferable examples of such aromatic amine compound include an aromatic diaminodiphenylmethane compound such as 3,3'-diethyl-4,4'-diaminodiphenylmethane, 3,3',5,5'-tetramethyl-4,4'-diaminodiphenylmethane and 3,3',5,5'-tetraethyl-4,4'-diaminodiphenylmethane; 2,4-diaminotoluene; 1,4-diaminobenzene; and 1,3-diaminobenzene. More preferred are aromatic diaminodiphenylmethane compounds such as 3,3'-diethyl-4,4'-diaminodiphenylmethane, 3,3',5,5'-tetramethyl-4,4'-diaminodiphenylmethane and 3,3',5,5'-tetraethyl-4,4'-diaminodiphenylmethane. Any one kind of these compounds may be used alone, or two or more kinds of them may be used in combination.

The amine compound may be either a liquid or a solid at normal temperature (20 to 30° C.). An amine compound being a liquid at normal temperature may be added as it is without problem. However, in the case of an amine compound being a solid at normal temperature, if the compound is added as it is, the viscosity of the resin composition will rise, and a workability will thus be significantly impaired; it is preferred that the amine compound be previously melted and mixed with the abovementioned epoxy resin, more specifically, it is preferred that such amine compound be melted and mixed with the epoxy resin at a later-described particular compounding ratio and at a temperature of 70 to 150° C. for one to two hours. If the mixing temperature is lower than 70° C., the amine compound may not be compatible enough; if the mixing temperature is greater than 150° C., a rise in viscosity may be observed due to the reaction with the epoxy resin. Further, if the mixing time is shorter than one hour, a rise in viscosity may be incurred due to an insufficient compatibility of the amine compound; if the mixing time is longer than two hours, a rise in viscosity may be observed due to the reaction with the epoxy resin.

As a phenolic compound, a generally known phenolic compound may be used. For example, there may be listed a phenol novolac resin, a naphthalene ring-containing phenolic resin, an aralkyl-type phenolic resin, a triphenolalkane-type phenolic resin, a biphenyl skeleton-containing aralkyl-type phenolic resin, a biphenyl-type phenolic resin, an alicyclic phenolic resin, a heterocyclic phenolic resin, a naphthalene ring-containing phenolic resin, a resorcinol-type phenolic resin, an allyl group-containing phenolic resin such as a novolac-type allylphenolic resin, and a bisphenol-type phenolic resin such as a bisphenol A-type resin and a bisphenol F-type resin. Any one kind of these compounds may be used alone, or two or more kinds of them may be used in combination.

As an acid anhydride compound, a generally known acid anhydride compound may be used. For example, there may be listed 4-methylcyclohexane-1,2-dicarboxylic acid anhydride, 3,4-dimethyl-6-(2-methyl-1-propenyl)-1,2,3,6-tetrahydrophthalic anhydride, isopropyl-4-methyl-bicyclo[2.2.2]oct-5-en-2,3-dicarboxylic acid anhydride, methyltetrahydrophthalic anhydride, methylhexahydrophthalic anhydride, hexahydrophthalic anhydride, methylhymic acid anhydride, pyromellitic acid dianhydride, maleated allo-ocimene, benzophenone tetracarboxylic acid dianhydride, 3,3',4,4'-biphenyltetrabisbenzophenone tetracarboxylic acid dianhydride, (3,4-dicarboxyphenyl)ether dianhydride, bis(3,4-dicarboxyphenyl)methane dianhydride, and 2,2-bis(3,4-dicarboxyphenyl)propane dianhydride. Any one kind of these compounds may be used alone, or two or more kinds of them may be used in combination.

As an active ester compound, a generally known active ester compound may be used. For example, there may be listed an active ester compound having a dicyclopentadiene-type phenolic resin structure, an active ester compound having a phenol novolac structure, an active ester compound having a naphthalene ring structure, an active ester compound having an aralkyl-type phenolic resin structure, an active ester compound having a triphenolalkane-type phenolic resin structure, an active ester compound having a biphenyl skeleton-containing aralkyl-type phenolic resin structure, an active ester compound having a biphenyl-type phenolic resin structure, an active ester compound having an alicyclic phenolic resin structure, an active ester compound having a heterocyclic phenolic resin structure, an active ester compound having a naphthalene ring-containing phenolic resin structure, an active ester compound having a resorcinol-type phenolic resin structure, an active ester compound having an allyl group-containing phenolic resin structure, an active ester compound having a bisphenol A-type resin structure, and an active ester compound having a bisphenol-type phenolic resin structure such as a bisphenol F-type resin structure. Any one kind of these compounds may be used alone, or two or more kinds of them may be used in combination.

The epoxy resin curing agent is preferably added in an amount at which a molar equivalent ratio of the functional groups in the epoxy resin curing agent to 1 molar equivalent of the epoxy groups in the component (B) will be 0.1 to 4.0, more preferably 0.2 to 2.0, particularly preferably 0.4 to 1.0. When this molar equivalent ratio is lower than 0.1, unreacted epoxy groups will remain so that an adhesiveness may deteriorate; when this molar equivalent ratio is greater than 4.0, a moisture absorption rate of the cured product will increase so that cracks may occur at the time of performing reflow or temperature cycling. Here, in the present invention, an equivalent refers to a molecular weight per one functional group.

(D) Curing Accelerator

A curing accelerator as a component (D) may simply be that capable of promoting the curability of the citraconimide compound (A); there may be used a generally known curing accelerator such as an imidazole-based curing accelerator, an organic phosphorus-based curing accelerator, and a tertiary amine-based curing accelerator. As the curing accelerator as the component (D), there may be listed, for example, a phosphine such as triphenylphosphine, tributylphosphine, tri(p-methylphenyl)phosphine and tri(nonylphenyl)phosphine; a phosphine-borane complex such as triphenylphosphine-triphenylborane; a phosphonium borate salt such as tetraphenylphosphonium tetraphenylborate, tetraphenylphosphonium tetra-p-tolylborate, p-tolyltriphenylphosphonium tetra-p-tolylborate and tri-tert-butylphosphonium tetraphenylborate; an organic phosphorus-based compound such as bis(tetrabutylphosphonium)dihydrogen pyromellitate; a tertiary amine compound such as triethylamine, benzyldimethylamine, α-methylbenzyldimethylamine and 1,8-diazabicyclo[5.4.0]undecene-7; a salt of a tertiary amine compound such as 1,8-diazabicyclo[5.4.0]undecene-7; and an imidazole compound such as 2-methylimidazole, 2-phenylimidazole, 2-ethyl-4-methylimidazole and 2-phenyl-4-methylimidazole. Particularly, preferred are a salt of a tertiary amine compound and an organic phosphorus-based compound; more preferred are a salt of 1,8-diazabicyclo[5.4.0]undecene-7 and tetraphenylphosphonium tetraphenylborate.

One kind of the component (D) may be used alone, or two or more kinds thereof may be used in combination.

The curing accelerator (D) is preferably added in an amount of 0.01 to 20 parts by mass, more preferably 0.5 to 10 parts by mass, per 100 parts by mass of the component (A). Other additives In addition to the components (A) to (D), other additives may also be added to the heat-curable resin composition of the present invention if necessary, provided that the purposes and effects of the present invention will not be impaired. Examples of such additives include an inorganic filler, a flame retardant, an ion trapping agent, an antioxidant, an adhesiveness imparting agent, a low stress agent and a colorant.

An inorganic filler is added to improve the resin strength of the heat-curable resin composition and realize a lower thermal expansion thereof. Examples of an inorganic filler include silicas (e.g. molten silica, crystalline silica, cristobalite), alumina, silicon nitride, aluminum nitride, boron nitride, titanium oxide, glass fibers and magnesium oxide. The average particle sizes and shapes of these inorganic fillers may be selected depending on intended uses.

In order to improve a coupling strength between the resin and the inorganic filler, it is preferred that there be used an inorganic filler that has been previously surface-treated with a coupling agent such as a silane coupling agent and a titanate coupling agent. As such coupling agent, there may be listed silane coupling agents including, for example, an epoxysilane such as γ-glycidoxypropyltrimethoxysilane, γ-glycidoxypropylmethyldiethoxysilane and β-(3,4-epoxycyclohexyl)ethyltrimethoxysilane; an amino silane such as N-β(aminoethyl)-γ-aminopropyltrimethoxysilane, a reaction product of imidazole and γ-glycidoxypropyltrimethoxysilane, γ-aminopropyltriethoxysilane and N-phenyl-γ-aminopropyltrimethoxysilane; and a mercaptosilane such as γ-mercaptosilane and γ-episulfidoxypropyltrimethoxysilane. Here, there are no particular restrictions on an added amount of the coupling agent for use in surface treatment and on a surface treatment method.

The inorganic filler is preferably added in an amount of 10 to 20,000 parts by mass, more preferably 30 to 10,000 parts by mass, per 100 parts by mass of the component (A).

A flame retardant is added to impart a flame retardancy. There are no particular restrictions on such flame retardant, and any known flame retardant can be used, examples of which include a phosphazene compound, a silicone compound, a zinc molybdate-supported talc, a zinc molybdate-supported zinc oxide, aluminum hydroxide, magnesium hydroxide and molybdenum oxide.

An ion trapping agent is added to prevent heat deterioration and moisture absorption deterioration by trapping the ion impurities contained in the resin composition. There are no particular restrictions on such ion trapping agent, and any known ion trapping agent can be used, examples of which include hydrotalcites, a bismuth hydroxide compound and a rare-earth oxide.

There are no particular restrictions on an antioxidant, examples of which may include a phenol-based antioxidant such as n-octadecyl-3-(3,5-di-t-butyl-4-hydroxyphenyl)propionate, n-octadecyl-3-(3,5-di-t-butyl-4-hydroxyphenyl)acetate, neododecyl-3-(3,5-di-t-butyl-4-hydroxyphenyl)propionate, dodecyl-β-(3,5-di-t-butyl-4-hydroxyphenyl) propionate, ethyl-α-(4-hydroxy-3,5-di-t-butylphenyl) isobutyrate, octadecyl-α-(4-hydroxy-3,5-di-t-butylphenyl) isobutyrate, octadecyl-α-(4-hydroxy-3,5-di-t-butyl-4-hydroxyphenyl)propionate, 2-(n-octylthio)ethyl-3,5-di-t-butyl-4-hydroxyphenyl acetate, 2-(n-octadecylthio)ethyl-3,5-di-t-butyl-4-hydroxyphenyl acetate, 2-(n-octadecylthio)ethyl-3-(3,5-di-t-butyl-4-hydroxyphenyl)propionate, 2-(2-stearoyloxyethylthio)ethyl-7-(3-methyl-5-t-butyl-4-hydroxyphenyl)heptanoate, 2-hydroxyethyl-7-(3-methyl-5-t-butyl-4-hydroxyphenyl)propionate and pentaerythritol tetrakis[3-(3,5-di-t-butyl-4-hydroxyphenyl)propionate]; a sulfur-based antioxidant such as dilauryl-3,3'-thiodipropionate, dimyristyl-3,3'-thiodipropionate, distearyl-3,3'-thiodipropionate, ditridecyl-3,3'-thiodipropionate and pentaerythrityl tetrakis(3-laurylthiopropionate); and a phosphorus-based antioxidant such as tridecyl phosphite, triphenyl phosphite, tris(2,4-di-t-butylphenyl)phosphite, 2-ethylhexyldiphenyl phosphite, diphenyl tridecyl phosphite, 2,2-methylenebis(4,6-di-t-butylphenyl)octyl phosphite, distearyl pentaerythritol diphosphite, bis(2,6-di-t-butyl-4-methylphenyl)pentaerythritol diphosphite, and 2-[[2,4,8,10-tetrakis(1,1-dimethyl ethyl)dibenzo[d,f][1,3,2] dioxaphosphepin-6-yl]oxy]-N,N-bis[2-[[2,4,8,10-tetrakis (1,1-dimethylethyl)dibenzo[d,f][1,3,2]dioxaphosphepin-6-yl]oxy]-ethyl]ethanamine.

There are no particular restrictions on an adhesiveness imparting agent so long as it is a known adhesiveness imparting agent and is capable of achieving the function effect of the present invention; the adhesiveness imparting agent may be contained if necessary so that an adhesiveness or stickiness (pressure-sensitive adhesiveness) can be imparted. Examples of such adhesiveness imparting agent include a urethane resin, a phenolic resin, a terpene resin and a silane coupling agent. Particularly, in terms of imparting an adhesiveness, a silane coupling agent is preferred.

There are no particular restrictions on a silane coupling agent, examples of which may include silane coupling agents such as n-propyltrimethoxysilane, n-propyltriethoxysilane, n-octyltrimethoxysilane, n-octyltriethoxysilane, phenyltrimethoxysilane, phenyltriethoxysilane, methyltrimethoxysilane, methyltriethoxysilane, 2-[methoxy(polyethyleneoxy)propyl]-trimethoxysilane, methoxytri(ethyleneoxy)propyltrimethoxysilane, 3-glycidyloxypropyltrimethoxysilane, 3-aminopropyltrimethoxysilane, 3-mercaptopropyltrimethoxysilane, 3-(methacryloyloxy)propyltrimethoxysilane, 3-isocyanatopropyltriethoxysilane and 3-isocyanatopropyltrimethoxysilane.

The amount of the other additives added varies depending on the purpose of the composition; normally, they are added in an amount of not larger than 5% by mass with respect to the whole composition excluding the inorganic filler.

Production Method of Composition

The heat-curable resin composition of the present invention can be produced by the method described below.

For example, the components (A) to (D) may be simultaneously or separately mixed, stirred, dissolved and/or dispersed while performing a heating treatment if necessary, thereby obtaining a mixture of the components (A) to (D). Preferably, the mixture of the components (A) to (D) may also be obtained by adding the curing accelerator (D) to a mixture of the components (A) to (C) and then stirring, dissolving and/or dispersing them. Further, depending on an intended use, at least one of an inorganic filler, a flame retardant, a polymerization initiator and an ion trapping agent may be added to and mixed with the mixture of the components (A) to (D). As for each component, one kind thereof may be used alone, or two or more kinds thereof may be used in combination.

In the production method of the composition, there are no particular restrictions on a device for performing mixing, stirring and dispersing. Specifically, there may be used, for example, a grinding machine equipped with a stirring and heating devices, a twin roll mill, a triple roll mill, a ball mill, a planetary mixer, or a mass colloider; these devices may be appropriately combined at the time of use.

Uses

The heat-curable resin composition of the present invention has an excellent handling property due to its low viscosity, and is capable of being turned into a cured product having a low relative permittivity, a low dielectric tangent, a superior adhesiveness and a high heat resistance; the heat-curable resin composition of the present invention can be favorably used as an adhesive agent and a semiconductor encapsulation material.

If used as an adhesive agent, it is preferred that the components be combined together at the given compounding ratios as above, followed by using a mixer such as a planetary mixer to mix them, and then, if necessary, using a triple roll mill to knead and mix them so as to improve dispersibility.

Further, if used as a semiconductor encapsulation material, it is preferred that the components be combined together at the given compounding ratios as above, followed by using a mixer or the like to sufficiently uniformly mix them, and then using a heated roll, a kneader, an extruder or the like to melt and mix them before solidifying the mixed product by cooling and then crushing it into an appropriate size(s).

As a common molding method using a semiconductor encapsulation material, there may be listed a transfer molding method and a compression molding method. In a transfer molding method, a transfer molding machine is used to perform molding at a molding pressure of 5 to 20 N/mm$^2$, and at a molding temperature of 120 to 190° C. for a molding period of 30 to 500 sec, preferably at a molding temperature of 150 to 185° C. for a molding period of 30 to 180 sec. Further, in a compression molding method, a compression molding machine is used to perform molding at a molding temperature of 120 to 190° C. for a molding period of 30 to 600 sec, preferably at a molding temperature of 130 to 160° C. for a molding period of 120 to 300 sec. Furthermore, in each molding method, post curing may be performed at 150 to 225° C. for 0.5 to 20 hours.

Working Examples

The present invention is described in greater detail hereunder with reference to working and comparative examples; the present invention shall not be limited to the following working examples. Here, in Tables 1 to 3, the amounts of the components added are expressed as parts by mass.

The components used in the working and comparative examples are as follows. Here, in the following description, a number average molecular weight (Mn) is a number average molecular weight in terms of polystyrene that is measured by gel permeation chromatography (GPC) under the measurement conditions below.

[GPC Measurement Conditions]
Developing solvent: Tetrahydrofuran (THF)
Flow rate: 0.35 mL/min
Detector: Refractive index detector (RI)
Column: TSK Guardcolumn Super H-L
TSK gel Super HZ4000 (4.6 mmI.D.×15 cm×1)
TSK gel Super HZ3000 (4.6 mmI.D.×15 cm×1)
TSK gel Super HZ2000 (4.6 mmI.D.×15 cm×2)
(All manufactured by TOSOH CORPORATION)
Column temperature: 40° C.
Sample injection volume: 5 μL (THF solution having a concentration of 0.2% by mass)
(A) Citraconimide Compound Synthesis Example 1 (Production of Citraconimide Compound, Formula (2))

A reaction solution was prepared by adding 52.29 g of 2-methylpentanediamine (0.45 mol), 111.0 g of citraconic anhydride (0.99 mol) and 150 g of toluene to a 2 L four-necked glass flask equipped with a stirrer, a Dean-Stark tube, a cooling condenser and a thermometer, followed by stirring the reaction solution at 80° C. for three hours to synthesize an amic acid. Next, 40 g of methanesulfonic acid was added to the reaction solution, followed by raising the temperature to 110° C., and then stirring the reaction solution for 16 hours while distilling away water generated as a by-product. After the stirring was over, the reaction solution was then washed five times with 200 g of an ion-exchange water. Later, by performing stripping under a reduced pressure at 60° C., there was obtained 130.1 g (yield 95%) of a target product being a brown liquid at room temperature (formula (2), (A1), Mn 510).

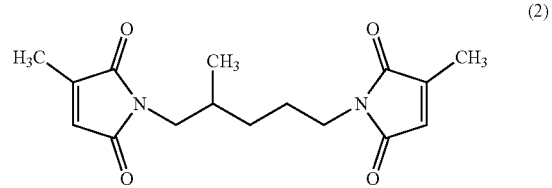

Synthesis Example 2 (Production of Citraconimide Compound, Formula (3))

A reaction solution was prepared by adding 71.2 g of 2,2,4-trimethylhexanediamine (0.45 mol), 111.0 g of citraconic anhydride (0.99 mol) and 150 g of toluene to a 2 L four-necked glass flask equipped with a stirrer, a Dean-Stark tube, a cooling condenser and a thermometer, followed by stirring the reaction solution at 80° C. for three hours to synthesize an amic acid. Next, 40 g of methanesulfonic acid was added to the reaction solution, followed by raising the temperature to 110° C., and then stirring the reaction solution for 16 hours while distilling away water generated as a by-product. After the stirring was over, the reaction solution was then washed five times with 200 g of an ion-exchange water. Later, by performing stripping under a reduced pressure at 60° C., there was obtained 149.7 g (yield 96%) of a target product being a brown liquid at room temperature (formula (3), (A2), Mn 590).

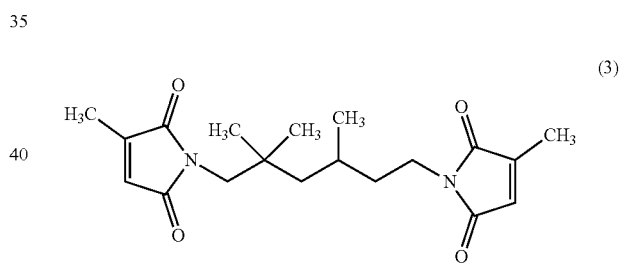

Synthesis Example 3 (Production of Citraconimide Compound, Formula (4))

A reaction solution was prepared by adding 184.7 g of BAPP (0.45 mol), 111.0 g of citraconic anhydride (0.99 mol) and 150 g of toluene to a 2 L four-necked glass flask equipped with a stirrer, a Dean-Stark tube, a cooling condenser and a thermometer, followed by stirring the reaction solution at 80° C. for three hours to synthesize an amic acid. Next, 40 g of methanesulfonic acid was added to the reaction solution, followed by raising the temperature to 110° C., and then stirring the reaction solution for 16 hours while distilling away water generated as a by-product. After the stirring was over, the reaction solution was then washed five times with 200 g of an ion-exchange water. Later, the reaction solution washed was put into heptane, and a precipitate was then collected by filtration, thereby obtaining 257.1 g (yield 95%) of a target product being a yellow powder (formula (4), (A3), Mn 600).

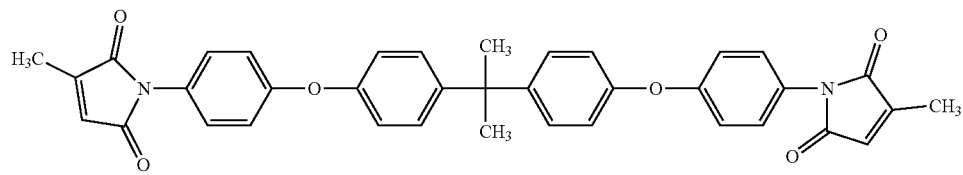

(4)

Synthesis Example 4 (Production of Citraconimide Compound, Formula (5))

A reaction solution was prepared by adding 155.0 g of bisaniline M (0.45 mol), 111.0 g of citraconic anhydride (0.99 mol) and 150 g of toluene to a 2 L four-necked glass flask equipped with a stirrer, a Dean-Stark tube, a cooling condenser and a thermometer, followed by stirring the reaction solution at 80° C. for three hours to synthesize an amic acid. Next, 40 g of methanesulfonic acid was added to the reaction solution, followed by raising the temperature to 110° C., and then stirring the reaction solution for 16 hours while distilling away water generated as a by-product. After the stirring was over, the reaction solution was then washed five times with 200 g of an ion-exchange water. Later, by performing stripping under a reduced pressure at 60° C., there was obtained 229.7 g (yield 96%) of a target product being a yellow liquid at room temperature (formula (5), (A4), Mn 530).

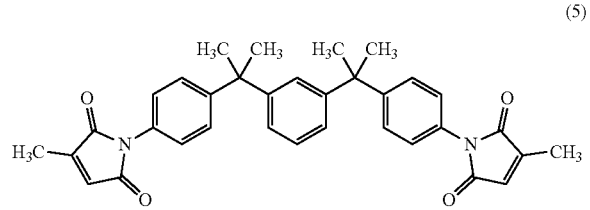

(5)

(B) Epoxy Resin (B1) Bisphenol A-type epoxy resin (jER828EL by Mitsubishi Chemical Holdings Corporation, liquid at 25° C., epoxy group equivalent 189)

(B2) Biphenyl aralkyl-type epoxy resin (NC-3000 by Nippon Kayaku Co., Ltd., softening point 56° C., epoxy group equivalent 273)

(B3) Naphthalene-type epoxy resin (ESN-475V by NIPPON STEEL Chemical & Material Co., Ltd., softening point 80° C., epoxy group equivalent 330)

(C) Epoxy Resin Curing Agent (C1) 3,3'-diethyl-4,4'-diaminodiphenylmethane (KAYA-HARD AA by Nippon Kayaku Co., Ltd., amino group equivalent 63.5)

(C2) Novolac-type allylphenolic resin (MEH-8000H by Meiwa Plastic Industries, Ltd., phenolic hydroxy group equivalent 141)

(C3) 4-methylcyclohexane-1,2-dicarboxylic acid anhydride (RIKACID MH by New Japan Chemical Co., Ltd., acid anhydride equivalent 168)

(C4) Active ester compound having dicyclopentadiene-type phenolic resin structure (HPC-8000-65T by DIC Corporation, active ester group equivalent 223, toluene varnish/solid content 65%); expressed as solid contents in Tables 1 to 3

(D) Curing Accelerator (D1) 2-ethyl-4-methylimidazole (2E4MZ by SHIKOKU CHEMICALS CORPORATION)

(D2) bis(tetrabutylphosphonium)dihydrogen pyromellitate (BTBP-pyromellitic acid by HOKKO CHEMICAL INDUSTRY CO., LTD.)

(E) Maleimide Compound (E1) Bisphenol A diphenylether bismaleimide (BMI-4000 by Daiwakasei Industry Co., LTD.)

(E2) 1,6-bismaleimide-(2,2,4-trimethyl)hexane (BMI-TMH by Daiwakasei Industry Co., LTD.)

These maleimide compounds (E) were used in the comparative examples so as to show the superiority of the citraconimide compound.

Heat-curable resin compositions were obtained by mixing the above components at the compounding ratios (parts by mass) shown in Tables 1 to 3. Here, the "equivalent ratio" in Tables 1 to 3 refers to a ratio of a molar equivalent (active hydrogen equivalent) of the functional groups in the epoxy resin curing agent as the component (C) to 1 molar equivalent of the epoxy groups in the epoxy resin as the component (B).

1. Viscosity

Each heat-curable resin composition prepared was subjected to measurement using a rheometer set to 120° C. (plate diameter 25 mm, measurement frequency 1 Hz), where as shown in Table 1, ○ was given to examples exhibiting a viscosity of not higher than 10 Pa·s, and x was given to examples exhibiting a viscosity of not lower than 10 Pa·s.

2. Relative Permittivity, Dielectric Tangent

A frame having a diameter of 200 mm and a thickness of 150 μm was prepared, and each heat-curable resin composition prepared in the working and comparative examples was then sandwiched between such frame and a PET film (E7006 by TOYOBO CO., LTD.) that had a thickness of 50 μm and had already been subjected to a mold release treatment, followed by using a vacuum press machine (by Nikko-Materials Co., Ltd.) to perform molding at 180° C. for 20 min, thereby obtaining a cured product. The cured product was then taken out of the PET film, and was actually cured under a condition(s) of 180° C., two hours to obtain a cured resin film.

A network analyzer (E5063-2D5 by Keysight Technologies) and a stripline (by KEYCOM Corporation) were then connected to such cured resin film to measure a relative permittivity and dielectric tangent thereof at a frequency of 10 GHz. The results thereof are shown in Tables 1 to 3.

3. Adhesive Force to Cu

Each heat-curable resin composition prepared in the working and comparative examples was poured into a mold to obtain a truncated cone-shaped test piece having an upper surface diameter of 2 mm, a lower surface diameter of 5 mm and a height of 3 mm. The test piece was placed on a Cu plate, and was then cured after being heated at 180° C. for three hours. After curing, a shearing adhesive force of the test piece obtained was measured at 150° C.; the measurement results thereof are shown in Tables 1 to 3.

4. Heat Cycle Test (Heat Resistance)

Using a Cu lead frame equipped with a PPS frame having a size of 50×70 mm, each composition prepared in the working and comparative examples was poured thereinto at 80° C. so that a thickness of the composition would be 2 mm, followed by further performing molding at 180° C. for three hours to obtain a molded product. After molding, the molded product was subjected to a heat cycle test (10 cycles were repeated where in each cycle, the molded product was held at −65° C. for 30 min and then at 200° C. for another 30 min); after the heat cycle test was over, an ultrasonic exploratory device was used to observe a peeling state between the resin and the Cu lead frame. Out of 10 molded products in total, the number of the molded products exhibiting peeling was counted. The results thereof are shown in Tables 1 to 3.

TABLE 1

|  |  | Working example 1 | Working example 2 | Working example 3 | Working example 4 | Working example 5 |
|---|---|---|---|---|---|---|
| Citraconimide compound(A1) |  | 100 |  |  |  | 100 |
| Citraconimide compound(A2) |  |  | 100 |  |  |  |
| Citraconimide compound(A3) |  |  |  | 100 |  |  |
| Citraconimide compound(A4) |  |  |  |  | 100 |  |
| Epoxy resin(B1) |  | 9.6 | 9.6 | 9.6 | 9.6 |  |
| Epoxy resin(B2) |  |  |  |  |  | 10.0 |
| Epoxy resin(B3) |  |  |  |  |  |  |
| Epoxy resin curing agent(C1) |  | 1.6 | 1.6 | 1.6 | 1.6 | 1.1 |
| Epoxy resin curing agent(C2) |  |  |  |  |  |  |
| Epoxy resin curing agent(C3) |  |  |  |  |  |  |
| Epoxy resin curing agent(C4) |  |  |  |  |  |  |
| Curing accelerator(D1) |  | 1.0 | 1.0 | 1.0 | 1.0 | 1.0 |
| Curing accelerator(D2) |  |  |  |  |  |  |
| Maleimide compound (E1) |  |  |  |  |  |  |
| Maleimide compound (E2) |  |  |  |  |  |  |
| Equivalent ratio |  | 0.5 | 0.5 | 0.5 | 0.5 | 0.5 |
| Viscosity |  | ○ | ○ | ○ | ○ | ○ |
| Relative permittivity(10 GHz) |  | 2.6 | 2.6 | 2.8 | 2.7 | 2.6 |
| Dielectric tangent(10 GHz) |  | 0.0026 | 0.0021 | 0.0054 | 0.0061 | 0.0024 |
| Adhesive force to Cu | MPa | 9.6 | 8.9 | 11.5 | 9.8 | 9.4 |
| Heat cycle test |  | 2/10 | 2/10 | 2/10 | 2/10 | 1/10 |

|  |  | Working example 6 | Working example 7 | Working example 8 | Working example 9 | Working example 10 |
|---|---|---|---|---|---|---|
| Citraconimide compound(A1) |  | 100 | 100 | 100 | 100 | 100 |
| Citraconimide compound(A2) |  |  |  |  |  |  |
| Citraconimide compound(A3) |  |  |  |  |  |  |
| Citraconimide compound(A4) |  |  |  |  |  |  |
| Epoxy resin(B1) |  |  | 8.1 | 7.7 | 7.0 |  |
| Epoxy resin(B2) |  |  |  |  |  |  |
| Epoxy resin(B3) |  | 10.1 | 3.9 |  |  |  |
| Epoxy resin curing agent(C1) |  | 1.0 |  |  |  |  |
| Epoxy resin curing agent(C2) |  |  | 3.0 |  |  |  |
| Epoxy resin curing agent(C3) |  |  |  | 3.4 |  |  |
| Epoxy resin curing agent(C4) |  |  |  |  | 4.1 | 1.4 |
| Curing accelerator(D1) |  | 1.0 | 1.0 | 1.0 | 1.0 | 1.0 |
| Curing accelerator(D2) |  |  |  |  |  |  |
| Maleimide compound (E1) |  |  |  |  |  |  |
| Maleimide compound (E2) |  |  |  |  |  |  |
| Equivalent ratio |  | 0.5 | 0.5 | 0.5 | 0.5 | 0.5 |
| Viscosity |  | ○ | ○ | ○ | ○ | ○ |
| Relative permittivity(10 GHz) |  | 2.6 | 2.7 | 2.6 | 2.6 | 2.6 |
| Dielectric tangent(10 GHz) |  | 0.0021 | 0.0033 | 0.0029 | 0.0023 | 0.0019 |
| Adhesive force to Cu | MPa | 10.1 | 8.8 | 7.6 | 8.4 | 10.2 |
| Heat cycle test |  | 1/10 | 0/10 | 3/10 | 2/10 | 1/10 |

TABLE 2

|  | Working example 11 | Working example 12 | Working example 13 | Working example 14 | Working example 15 |
|---|---|---|---|---|---|
| Citraconimide compound(A1) | 100 | 100 | 100 | 100 | 100 |
| Citraconimide compound(A2) |  |  |  |  |  |
| Citraconimide compound(A3) |  |  |  |  |  |
| Citraconimide compound(A4) |  |  |  |  |  |
| Epoxy resin(B1) |  |  |  |  |  |
| Epoxy resin(B2) |  |  |  |  |  |
| Epoxy resin(B3) | 18.6 | 32.0 | 49.8 | 9.8 | 7.6 |

TABLE 2-continued

|  |  | Working example 11 | Working example 12 | Working example 13 | Working example 14 | Working example 15 |
|---|---|---|---|---|---|---|
| Epoxy resin curing agent(C1) |  |  |  |  |  |  |
| Epoxy resin curing agent(C2) |  |  |  |  |  |  |
| Epoxy resin curing agent(C3) |  |  |  |  |  |  |
| Epoxy resin curing agent(C4) |  | 6.4 | 10.9 | 16.8 | 1.3 | 3.6 |
| Curing accelerator(D1) |  | 1.3 | 1.4 | 1.7 | 1.0 | 1.0 |
| Curing accelerator(D2) |  |  |  |  |  |  |
| Maleimide compound (E1) |  |  |  |  |  |  |
| Maleimide compound (E2) |  |  |  |  |  |  |
| Equivalent ratio |  | 0.5 | 0.5 | 0.5 | 0.2 | 0.7 |
| Viscosity |  | ○ | ○ | ○ | ○ | ○ |
| Relative permittivity(10 GHz) |  | 2.6 | 2.6 | 2.6 | 2.6 | 2.6 |
| Dielectric tangent(10 GHz) |  | 0.0029 | 0.0039 | 0.0056 | 0.0031 | 0.0025 |
| Adhesive force to Cu | MPa | 9.6 | 9.8 | 8.6 | 8.4 | 8.6 |
| Heat cycle test |  | 0/10 | 2/10 | 3/10 | 1/10 | 1/10 |

|  |  | Working example 16 | Working example 17 | Working example 18 | Working example 19 | Working example 20 |
|---|---|---|---|---|---|---|
| Citraconimide compound(A1) |  | 100 | 100 | 100 |  |  |
| Citraconimide compound(A2) |  |  |  |  | 33 | 33 |
| Citraconimide compound(A3) |  |  |  |  | 67 |  |
| Citraconimide compound(A4) |  |  |  |  |  | 67 |
| Epoxy resin(B1) |  |  |  | 9.6 | 9.6 | 9.6 |
| Epoxy resin(B2) |  |  |  |  |  |  |
| Epoxy resin(B3) |  | 6.7 | 4.8 |  |  |  |
| Epoxy resin curing agent(C1) |  |  |  | 1.6 | 1.6 | 1.6 |
| Epoxy resin curing agent(C2) |  |  |  |  |  |  |
| Epoxy resin curing agent(C3) |  |  |  |  |  |  |
| Epoxy resin curing agent(C4) |  | 4.1 | 4.4 |  |  |  |
| Curing accelerator(D1) |  | 1.0 | 1.0 |  | 1.0 | 1.0 |
| Curing accelerator(D2) |  |  |  | 0.3 |  |  |
| Maleimide compound (E1) |  |  |  |  |  |  |
| Maleimide compound (E2) |  |  |  |  |  |  |
| Equivalent ratio |  | 1.0 | 2.0 | 0.5 | 0.5 | 0.5 |
| Viscosity |  | ○ | ○ | ○ | ○ | ○ |
| Relative permittivity(10 GHz) |  | 2.6 | 2.7 | 2.6 | 2.6 | 2.6 |
| Dielectric tangent(10 GHz) |  | 0.0024 | 0.0035 | 0.0024 | 0.0044 | 0.0041 |
| Adhesive force to Cu | MPa | 8.5 | 7.3 | 7.9 | 10.8 | 11.2 |
| Heat cycle test |  | 1/10 | 1/10 | 1/10 | 1/10 | 1/10 |

TABLE 3

|  |  | Comparative example 1 | Comparative example 2 | Comparative example 3 | Comparative example 4 | Comparative example 5 |
|---|---|---|---|---|---|---|
| Citraconimide compound(A1) |  | 100 |  |  |  | 100 |
| Citraconimide compound(A2) |  |  | 100 |  |  |  |
| Citraconimide compound(A3) |  |  |  | 100 |  |  |
| Citraconimide compound(A4) |  |  |  |  | 100 |  |
| Epoxy resin(B1) |  | 10.0 | 10.0 | 10.0 | 10.0 |  |
| Epoxy resin(B2) |  |  |  |  |  |  |
| Epoxy resin(B3) |  |  |  |  |  |  |
| Epoxy resin curing agent(C1) |  |  |  |  |  | 10.0 |
| Epoxy resin curing agent(C2) |  |  |  |  |  |  |
| Epoxy resin curing agent(C3) |  |  |  |  |  |  |
| Epoxy resin curing agent(C4) |  |  |  |  |  |  |
| Curing accelerator(D1) |  | 1.0 | 1.0 | 1.0 | 1.0 | 1.0 |
| Curing accelerator(D2) |  |  |  |  |  |  |
| Maleimide compound (E1) |  |  |  |  |  |  |
| Maleimide compound (E2) |  |  |  |  |  |  |
| Equivalent ratio |  | — | — | — | — | — |
| Viscosity |  | ○ | ○ | ○ | ○ | ○ |
| Relative permittivity(10 GHz) |  | 2.7 | 2.7 | 2.9 | 2.8 | 2.9 |
| Dielectric tangent(10 GHz) |  | 0.0053 | 0.0039 | 0.0079 | 0.0089 | 0.0084 |
| Adhesive force to Cu | MPa | 7.5 | 7.8 | 6.5 | 6.9 | 3.4 |
| Heat cycle test |  | 7/10 | 6/10 | 7/10 | 7/10 | 10/10 |

|  | Comparative example 6 | Comparative example 7 | Comparative example 8 | Comparative example 9 |
|---|---|---|---|---|
| Citraconimide compound(A1) | 100 |  |  |  |
| Citraconimide compound(A2) |  |  |  |  |
| Citraconimide compound(A3) |  |  |  |  |
| Citraconimide compound(A4) |  |  |  |  |

TABLE 3-continued

| | | | | |
|---|---|---|---|---|
| Epoxy resin(B1) | | 9.6 | 9.6 | 9.6 | 74.9 |
| Epoxy resin(B2) | | | | | |
| Epoxy resin(B3) | | | | | |
| Epoxy resin curing agent(C1) | | 1.6 | 1.6 | 1.6 | 25.1 |
| Epoxy resin curing agent(C2) | | | | | |
| Epoxy resin curing agent(C3) | | | | | |
| Epoxy resin curing agent(C4) | | | | | |
| Curing accelerator(D1) | | | 1.0 | 1.0 | 1.0 |
| Curing accelerator(D2) | | | | | |
| Maleimide compound (E1) | | | 100 | | |
| Maleimide compound (E2) | | | | 100 | |
| Equivalent ratio | | 0.5 | 0.5 | 0.5 | 1.0 |
| Viscosity | | ○ | × | × | ○ |
| Relative permittivity(10 GHz) | | Uncured | 3.0 | 2.7 | 3.1 |
| Dielectric tangent(10 GHz) | | | 0.0080 | 0.0053 | 0.0240 |
| Adhesive force to Cu | MPa | | 4.5 | 5.1 | 4.1 |
| Heat cycle test | | | 10/10 | 10/10 | 10/10 |

Each composition prepared in the working examples 1 to 20 exhibited a low viscosity and was thus superior in handling property. As can be seen from the results shown in Tables 1 to 3, it became clear that the cured product of the composition containing the citraconimide compound, epoxy resin, epoxy resin curing agent and curing accelerator was superior in adhesiveness to a base material and heat resistance while exhibiting low dielectric properties.

What is claimed is:

1. A heat-curable resin composition comprising:
   one or more of each of
   (A) a citraconimide compound;
   (B) an epoxy resin;
   (C) an epoxy resin curing agent; and
   (D) a curing accelerator,
   wherein the epoxy resin curing agent (C) is at least one selected from an amine compound, a phenolic compound, an acid anhydride compound and an active ester compound.

2. The heat-curable resin composition according to claim 1, wherein the citraconimide compound (A) is a biscitraconimide compound represented by the following formula (1):

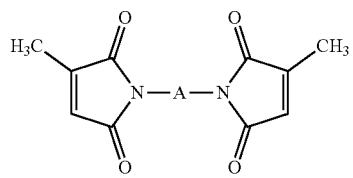

(1)

wherein A represents a divalent organic group.

3. The heat-curable resin composition according to claim 2, wherein A in the formula (1) is selected from the groups of the following structures and dimer acid skeleton-derived hydrocarbon groups:

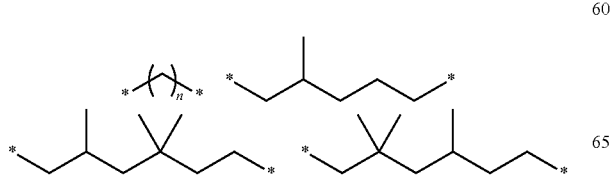

-continued

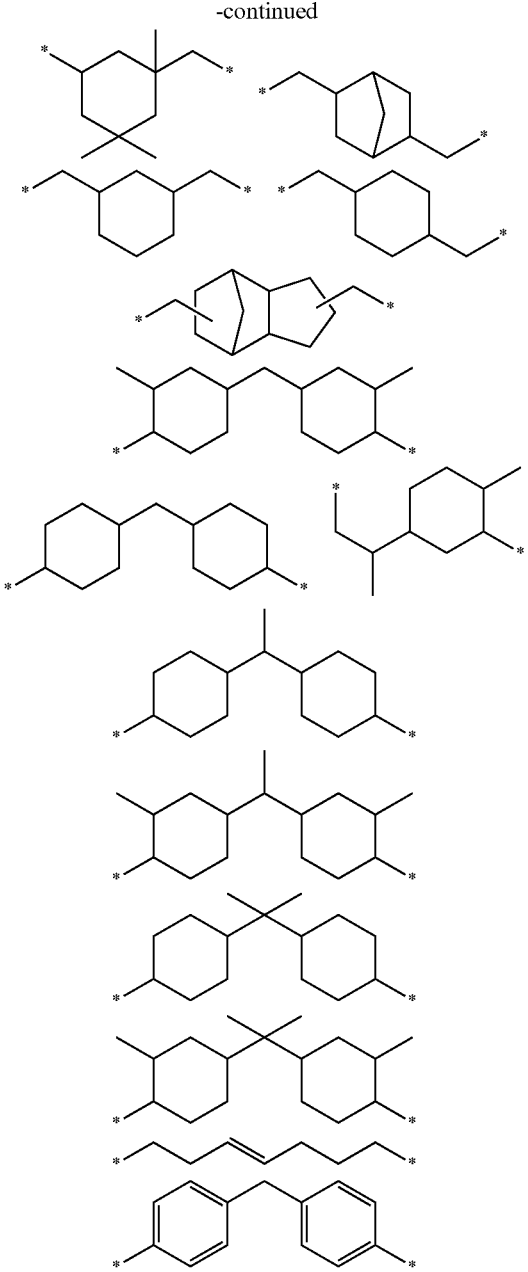

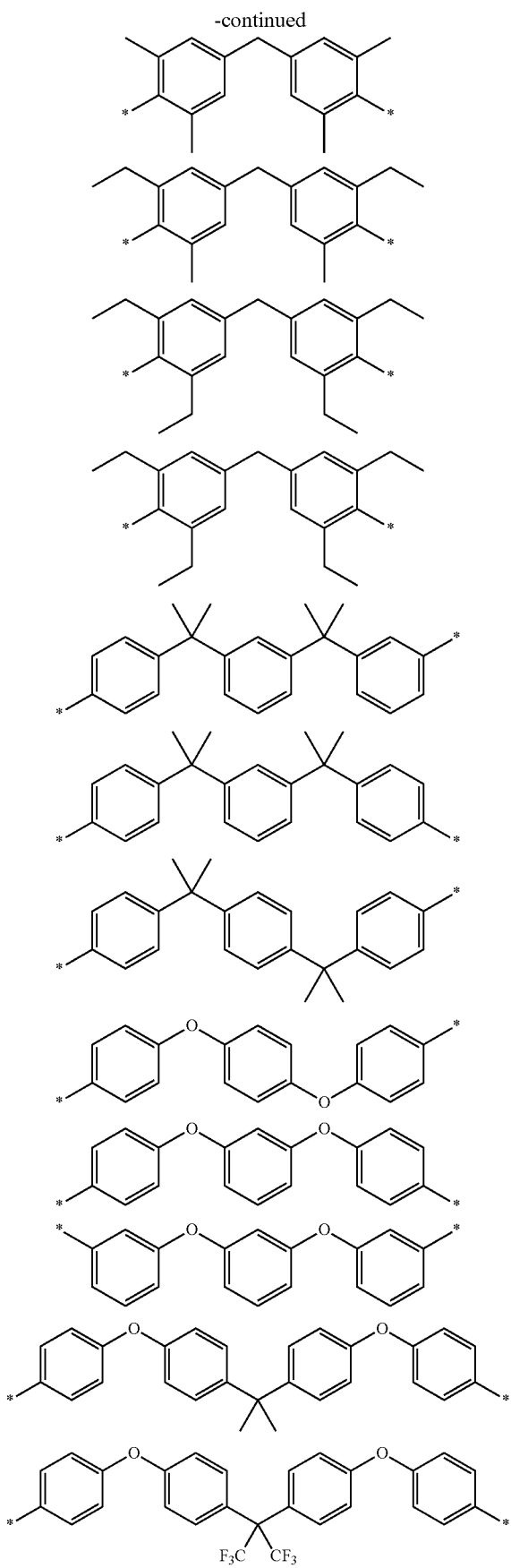

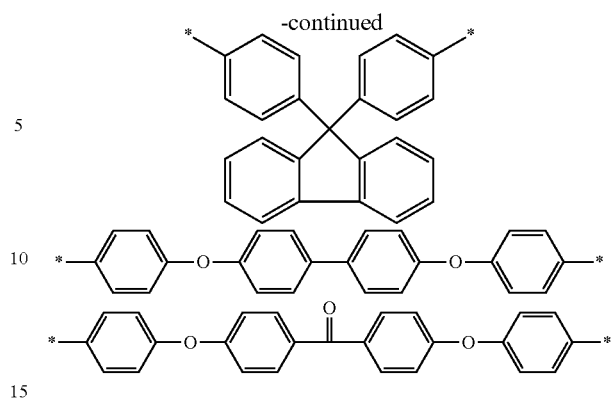

wherein * represents a bond to a nitrogen atom in the citraconimide group; n is 1 to 20.

4. The heat-curable resin composition according to claim 1, wherein the curing accelerator (D) contains at least one of an imidazole-based curing accelerator, an organic phosphorus-based curing accelerator and a tertiary amine-based curing accelerator.

5. The heat-curable resin composition according to claim 1, wherein the epoxy resin (B) has at least two epoxy groups per each molecule.

6. The heat-curable resin composition according to claim 1, wherein
the component (B) is contained in an amount of 1 to 900 parts by mass per 100 parts by mass of the component (A),
a molar equivalent ratio of functional groups in the curing agent as the component (C) that are reactive with epoxy groups to 1 molar equivalent of epoxy groups in the epoxy resin (B) is 0.1 to 4.0, and
the component (D) is contained in an amount of 0.01 to 20 parts by mass per 100 parts by mass of the component (A).

7. The heat-curable resin composition according to claim 1, wherein the citraconimide compound (A) has a number average molecular weight of 200 to 10,000.

8. An adhesive agent comprising the heat-curable resin composition according to claim 1.

9. A semiconductor encapsulation material comprising the heat-curable resin composition according to claim 1.

10. A heat-curable resin composition consisting essentially of:
one or more of each of
(A) a citraconimide compound;
(B) an epoxy resin;
(C) an epoxy resin curing agent;
(D) a curing accelerator; and
optionally, one or more of an inorganic filler, a flame retardant, an ion trapping agent, an antioxidant, an adhesiveness imparting agent, a low stress agent and a colorant,
wherein the epoxy resin curing agent (C) is at least one selected from an amine compound, a phenolic compound, an acid anhydride compound and an active ester compound.

11. The heat-curable resin composition according to claim 1, which consists of one or more of each of said components (A), (B), (C) and (D) and optionally one or more of an inorganic filler, a flame retardant, an ion trapping agent, an antioxidant, an adhesiveness imparting agent, a low stress agent and a colorant.

12. The heat-curable resin composition according to claim 11, which consists of one or more of each of said components (A), (B), (C) and (D).

13. The heat-curable resin composition according to claim 1, which comprises
one or more of each of
(A);
(B) in an amount of 3 to 200 parts by mass, per 100 parts by mass of the component (A),
(C) in an amount at which a molar equivalent ratio of the functional groups in the epoxy resin curing agent to 1 molar equivalent of the epoxy groups in the component (B) is 0.2 to 2.0; particularly preferably 0.4 to 1.0; and
(D) in an amount of preferably 0.5 to 10 parts by mass, per 100 parts by mass of the component (A).

14. The heat-curable resin composition according to claim 11, which consists of
one or more of each of
(A);
(B) in an amount of 3 to 200 parts by mass, per 100 parts by mass of the component (A);
(C) in an amount at which a molar equivalent ratio of the functional groups in the epoxy resin curing agent to 1 molar equivalent of the epoxy groups in the component (B) is 0.2 to 2.0, particularly preferably 0.4 to 1.0; and
(D) in an amount of preferably 0.5 to 10 parts by mass, per 100 parts by mass of the component (A); and
optionally, one or more of said optional components.

15. The heat-curable resin composition according to claim 11, which consists of
one or more of each of
(A);
(B) in an amount of 3 to 200 parts by mass, per 100 parts by mass of the component (A);
(C) in an amount at which a molar equivalent ratio of the functional groups in the epoxy resin curing agent to 1 molar equivalent of the epoxy groups in the component (B) is 0.2 to 2.0, particularly preferably 0.4 to 1.0; and
(D) in an amount of preferably 0.5 to 10 parts by mass, per 100 parts by mass of the component (A).

* * * * *